United States Patent [19]

Hentze

[11] 4,194,413
[45] Mar. 25, 1980

[54] CHAIN GUARD AND METHODS OF MAKING AND USING THE SAME

[76] Inventor: Bernhard K. Hentze, 7852 Folk, Maplewood, Mo. 63143

[21] Appl. No.: 833,715

[22] Filed: Sep. 16, 1977

[51] Int. Cl.² ............................................. F16P 1/00
[52] U.S. Cl. .................................................. 74/611
[58] Field of Search ........................ 74/611, 608, 609

[56] References Cited

U.S. PATENT DOCUMENTS

| | | | |
|---|---|---|---|
| Re. 11,700 | 10/1898 | Marchall | 74/611 |
| 583,904 | 6/1897 | Hill | 74/611 |
| 612,564 | 10/1898 | Gilbert | 74/611 |
| 614,038 | 11/1898 | Toquet | 74/611 |
| 617,683 | 1/1899 | Farmer | 74/611 |
| 618,945 | 2/1899 | Myers | 74/611 |
| 622,442 | 4/1899 | Brownell | 74/611 |
| 952,647 | 3/1910 | Sorensen | 74/611 |
| 3,515,013 | 6/1970 | Wykes | 74/611 |

FOREIGN PATENT DOCUMENTS

| | | | |
|---|---|---|---|
| 7953 | of 1895 | United Kingdom | 74/611 |
| 25190 | of 1897 | United Kingdom | 74/611 |
| 5615 | of 1898 | United Kingdom | 74/611 |
| 501618 | 3/1939 | United Kingdom | 74/611 |
| 607806 | 9/1948 | United Kingdom | 74/611 |

*Primary Examiner*—Samuel Scott
*Assistant Examiner*—Randall L. Green

[57] ABSTRACT

The present invention relates to a chain guard for a chain which is conventionally used as a means for transmitting power and typically includes individual roller link pairs coupled together by pin links, said guard consisting of an elongated flexible elastic member with its ends secured together forming a loop and provided with a chamber which opens inwardly of the loop and elongated slots provided in the chamber wall and disposed to accept the pin links and provided with lubricant storing means within the chamber.

3 Claims, 4 Drawing Figures

CHAIN GUARD AND METHODS OF MAKING AND USING THE SAME

THE BACKGROUND OF THE INVENTION

Chain drives are typically used for drives in bicycles, motorcycles and various types of machinery. Such chains typically consists of pairs of cylindrically shaped rollers secured together to form roller links and pin links utilized to secure adjacent roller links to form a loop. The chain loop is mounted about driven and driving sprockets to complete the drive system.

Problems associated with chain drives include spraying of lubricant from the chain, noisy operation, dirt, and frequent lubrication.

It is therefore an object of the present invention to provide a chain guard device which consists of an elastic and flexible tubing with its ends secured together forming a loop wherein the inner periphery of the tubing is provided with a channel which communicates with the interior chamber, with a pair of elongated channels provided on the interior surface of the tubing, disposed to accept lateral projections from the pin links and lubricant storage means installed within said tubing.

An object of the present invention is to provide such a device which is quickly mounted and removed from the chain.

A further object of the present invention is to provide such a device which minimizes loss of lubricant, reduces noise and protects the chain from foreign objects.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof wherein like numerals refer to like parts throughout, and in which;

DETAILED DESCRIPTION OF THE INVENTION

Figure 1:
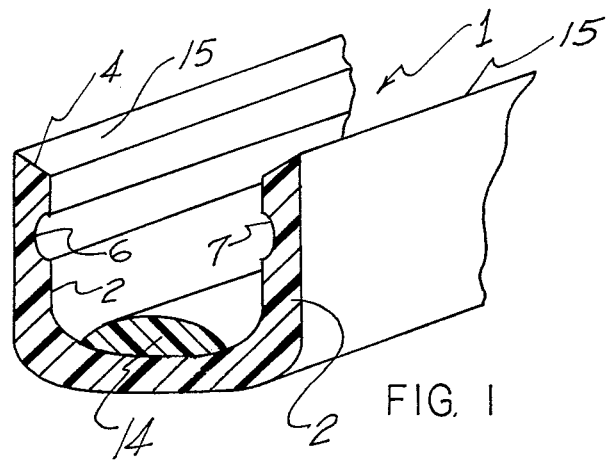
FIG. 1 is a partial perspective view of a chain guard device constructed in accordance with and embodying the present invention.

Referring now in more detail and by reference characters to the drawings which illustrate practical embodiments of the present invention, FIG. 1, is a partial perspective view of a chain guard, 1, constructed in accordance with, used in and embodying the present invention.

Figure 2:
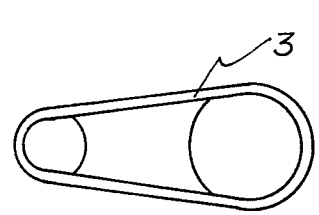
FIG. 2 is a functional drawing of the device in FIG. 1 in operation.
Figure 3:
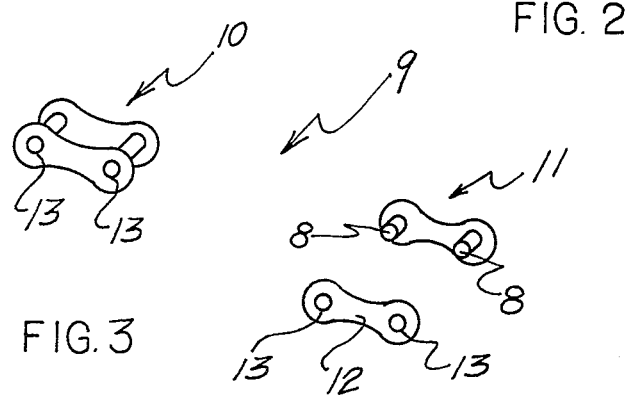
FIG. 3 is a perspective view of a part of chain used in conjunction with the device, in FIG. 1.
Figure 4:
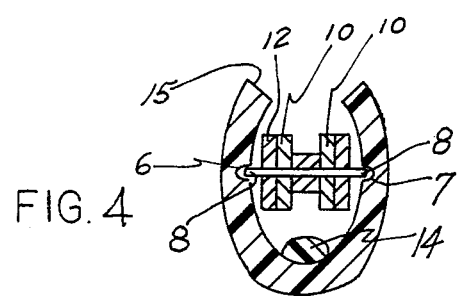
FIG. 4 is a sectional view of another embodiment to that shown in FIG. 1 constructed in accordance with and embodying the present invention.

As shown in FIG. 1 and FIG. 2, chain guard device 1, comprises a hollow, elongated, elastic and flexible tubular element, 2, with its ends secured together to form a loop, 3. Element, 2, is provided with exterior channel, 4, opening inwardly of loop, 3, and communicating with chamber, 5, in element, 2. Also provided in element, 2, are recesses, 6, and, 7, which are sized to accept pins 8, on chain element, 9. Chain element, 9, is shown in FIG. 3, to comprise roller link, 10, and pin link, 11, which is provided with pins 8, and plates, 12. Pins, 9, are inserted into apertures, 13, of adjacent roller links, 10, and secured by plates, 12.

In the construction of element, 2, it is contemplated that materials such as natural or synthethic rubber or the like may be used.

It is contemplated that element, 2, may be constructed as an integral loop or may be joined using conventional techniques such as cement or glue, staples, spring clips or a combination of a clip and a vulcanized patch.

Spongy element, 14, is installed in chamber, 5, to retain lubricant. Element, 14, may be typically constructed of sponge rubber.

Surface, 15, of element, 2, is beveled to retain lubricant.

It should be understood that changes and modifications in the form, construction, arrangement, and combination of the Chain Guard device and methods of making and using the same may be made and substituted for those herein shown and described without departing from the nature and principle of my invention.

Having thus described my invention, what I claim is new and desire to secure by United States Letters Patent is:

1. A chain guard for use with a chain drive provided with roller links secured together by pin links provided with pins comprising,
   an elongated elastic and flexible tubular element with its ends secured together to form a loop, said element provided with a channel opening inwardly of said loop and communicating with the interior space of the tubular element, thereby providing a "U" shaped cross section to said elongated element, the inner surface of said element beveled and a pair of arcuate elongated channels provided on the interior walls of said element, said arcuate elongated channels having a width substantially less than the length of a leg of "U" shaped cross section, and disposed to accept said pins from said pin links.

2. A chain guard as described in claim 1, in combination with lubricant retention means operably mounted on the interior wall of said element.

3. A chain guard as described in claim 2 wherein said lubricant retention means comprises an elongated sponge element operably secured to the inner surface of said elongated element.

* * * * *